Oct. 27, 1970                G. E. SCHENKENBERG                3,537,091
                              SEED MONITORING SYSTEM
Filed Oct. 5, 1967                                           3 Sheets-Sheet 1
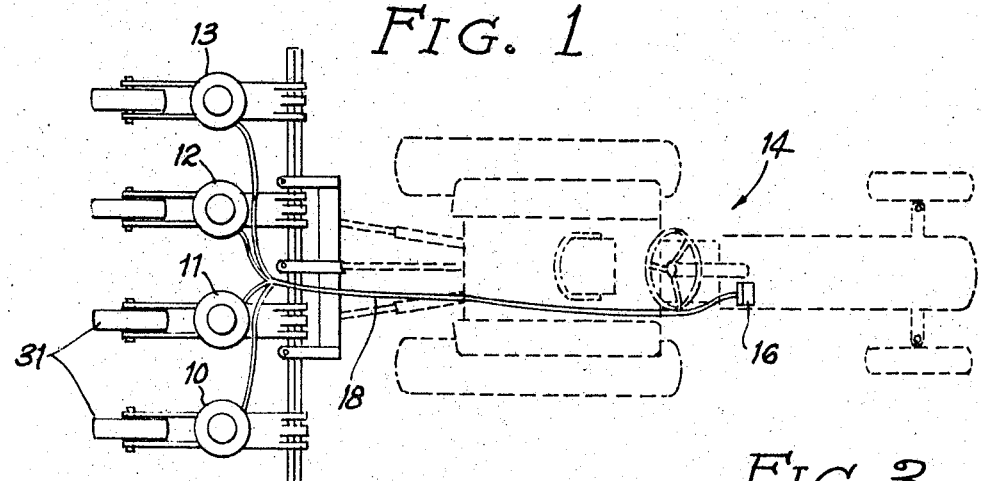
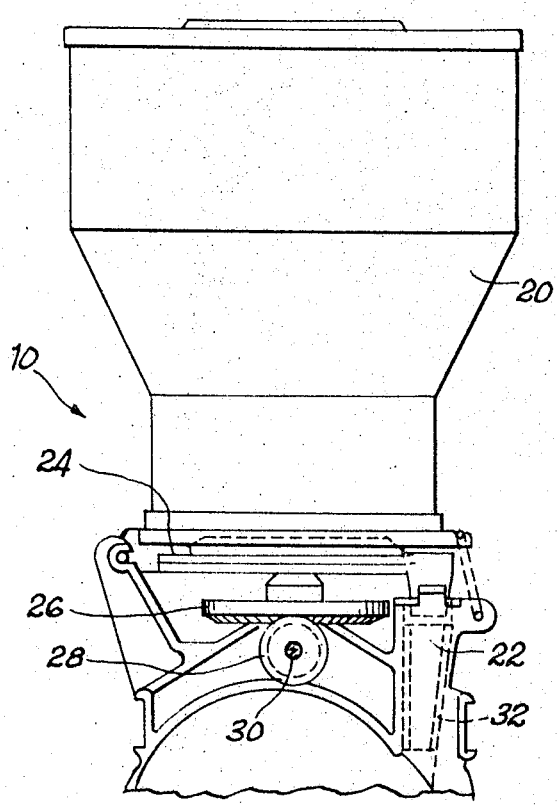
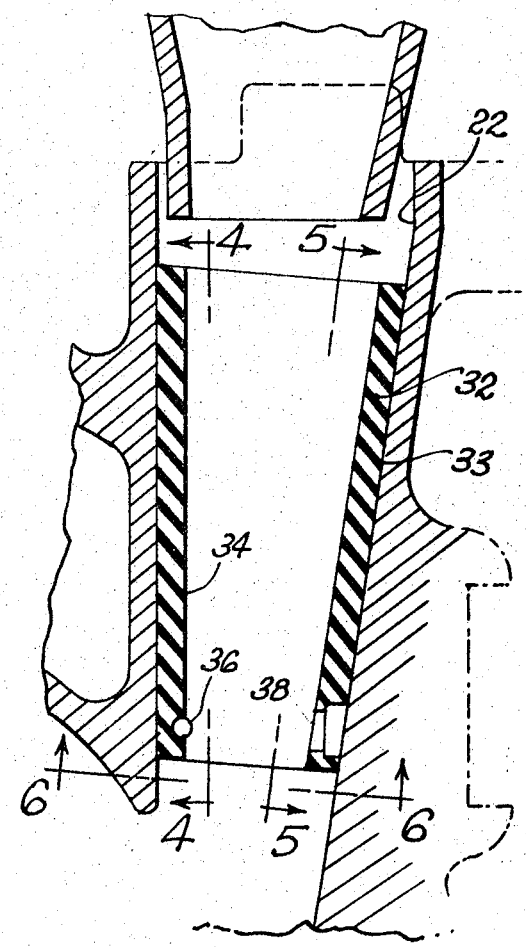
INVENTOR
Gerald E. Schenkenberg
by Dressler, Goldsmith,
Clement & Gordon
Attys Oct. 27, 1970 — G. E. SCHENKENBERG — 3,537,091
SEED MONITORING SYSTEM
Filed Oct. 5, 1967 — 3 Sheets-Sheet 2
FIG. 4
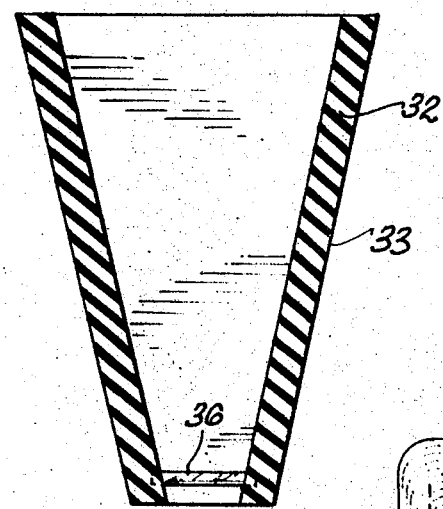
FIG. 5
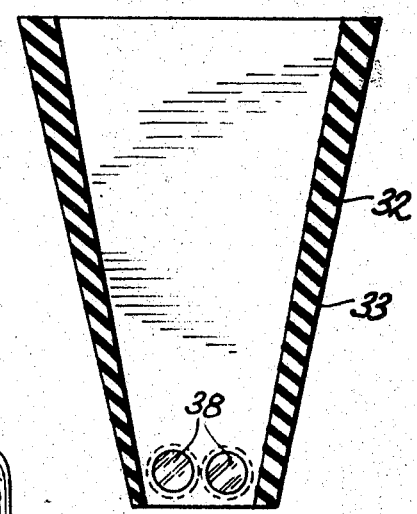
FIG. 6
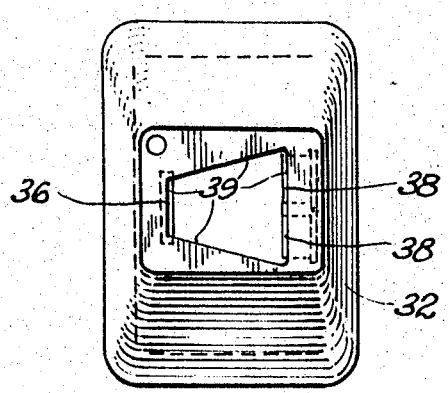
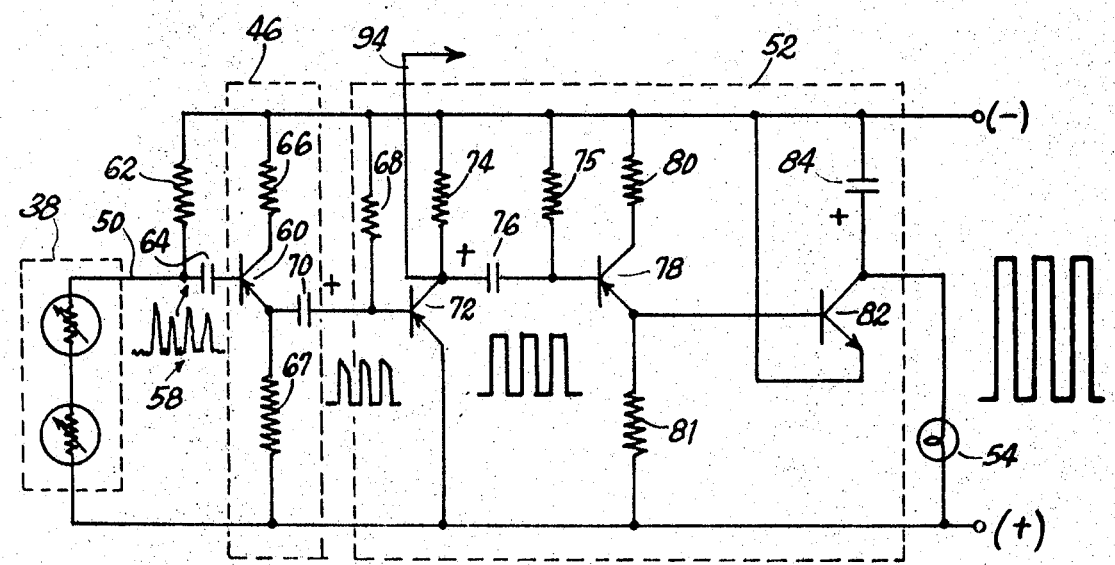
FIG. 8

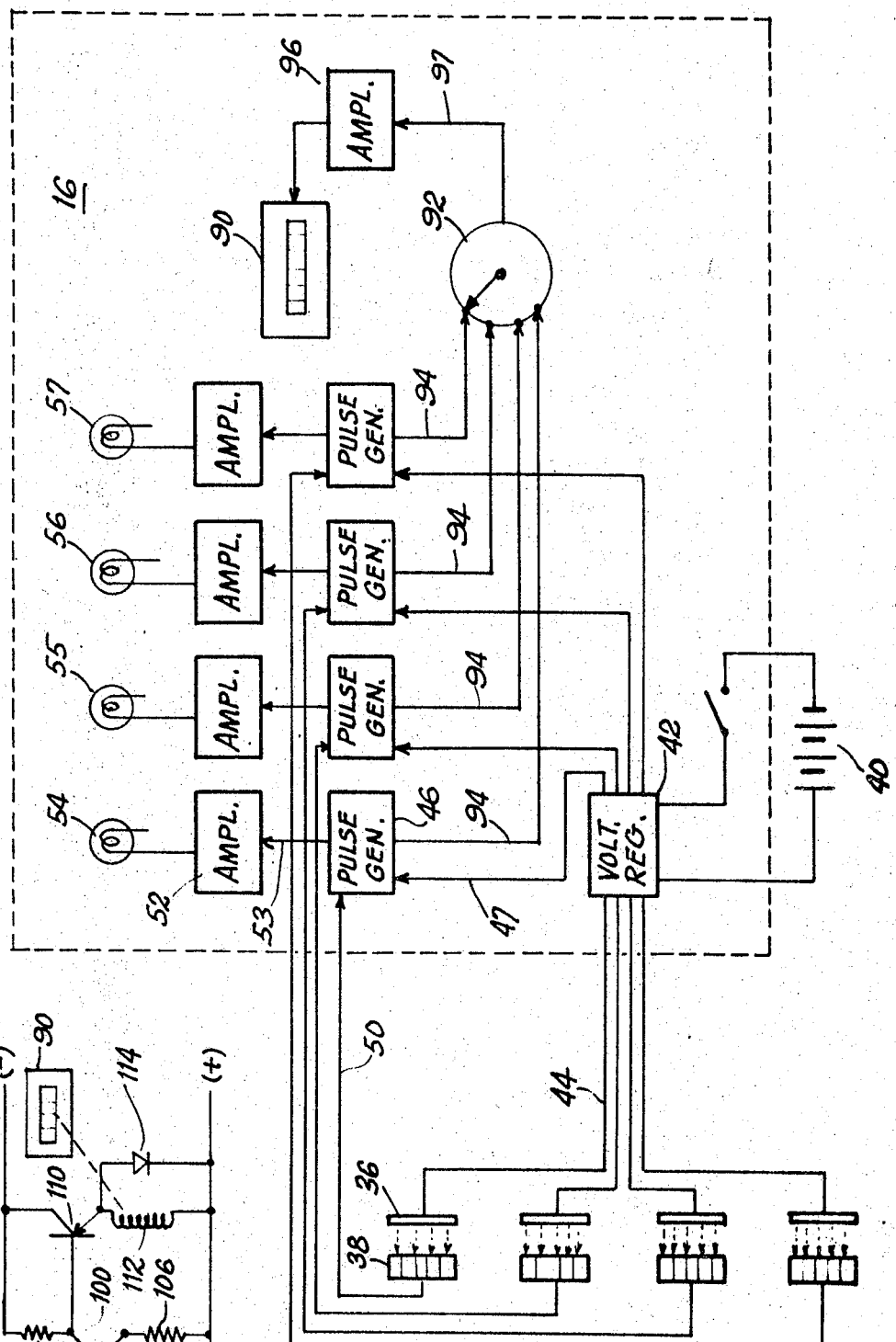
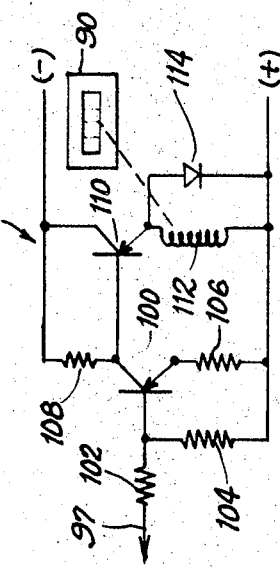
FIG. 7
FIG. 9

3,537,091
SEED MONITORING SYSTEM
Gerald E. Schenkenberg, Racine, Wis., assignor to J. I.
Case Company, a corporation of Wisconsin
Filed Oct. 5, 1967, Ser. No. 673,150
Int. Cl. G08b 21/00; G01n 21/26
U.S. Cl. 340—239       4 Claims

ABSTRACT OF THE DISCLOSURE

A seed monitoring system in which the seeds falling through a planter chute pass through a beam of light directed on photocells. The signal from the photocells is fed through a pulse generator and amplifier circuit to an indicating device which responds to passage of the seeds through the chute.

---

This invention relates to a novel system for monitoring the passage of seeds through a planter, and more particularly, to a method and apparatus for enabling the operator of a vehicle towing one or more seed planters, to be aware of the passage of seeds through each planter.

In the typical planting operation, a number of planters, each having a hopper for containing seeds and a chute which extends near the ground, are pulled by a tractor. If one or more of the planters becomes inoperative, it is apparent that unless the tractor operator is aware of the malfunction, a crop deficiency will result. It is not possible for the tractor operator to control the tractor and at the same time watch all of the planters. It is therefore very desirable that the tractor operator be able to monitor the output of the planters and simultaneously control the tractor.

Indicating systems have been proposed whereby the tractor driver can watch flashing lamps which are supposed to indicate whether the planters are operating properly. These indicating systems generally utilize a sensing device comprising a mechanical switch, which is actuated as a result of physical contact thereto by a seed passing through the chute. Such an indicating system is disclosed in the patent to J. D. Young, No. 2,907,015, issued Sept. 29, 1959. However, the mechanical switches that are used must be highly sensitive, and serious problems with such switches have occurred by reason of dust and moisture getting into the switches and causing a malfunction.

In the present invention, a system is provided whereby no mechanical switches are utilized in the sensing portion of the system. In this manner, the problem of malfunction caused by dust and moisture is obviated.

The seed monitoring system of the present invention can be used with a conventional seed planter having a hopper for containing the seeds to be planted and a chute through which the seeds are to be directed from the hopper. A source of light is located in the chute, and is directed to a photo-sensitive device which is responsive to a variation in the light received from the light source. An indicating device, electrically coupled to the photo-sensitive device through a pulse generator and amplifier circuit, is positioned on the tractor so that the operator can be aware of the functioning of the planter. Passage of a seed through the chute will cause a variation in the light received by the photo-sensitive device, thereby causing the indicating device to respond visually.

In the illustrative embodiment of the invention, a number of planters are utilized, each having a source of light and a photo-sensitive device positioned in its chute. Each of the photo-sensitive devices is electrically coupled to a lamp on the tractor which emits a flashing light in response to variations in the light received by the respective photo-sensitive device due to passage of seeds through the respective chute. A counting mechanism is also electrically coupled to the photo-sensitive devices in order to apprise the operator as to the population of seeds which have passed through a predetermined one of the planters.

A more detailed explanation of the invention is provided in the following description and claims, and is illustrated in the accompanying drawings, in which:

FIG. 1 is a top plan view of a tractor and planter arrangement having a seed monitoring system in accordance with the present invention connected thereto;

FIG. 2 is an elevational view, partially in section, of a typical planter having an auxiliary sensing chute positioned therein;

FIG. 3 is an enlarged, fragmentary sectional elevation of the auxiliary sensing chute positioned within the planter chute;

FIG. 4 is a cross-sectional view of the sensing chute taken along the line 4—4 of FIG. 3;

FIG. 5 is a cross-sectional view of the sensing chute taken along the line 5—5 of FIG. 3;

FIG. 6 is a cross-sectional view of the sensing chute taken along the line 6—6 of FIG. 3;

FIG. 7 is a schematic block diagram of the electrical system utilized by the illustrated monitoring apparatus;

FIG. 8 is a schematic circuit diagram of the photocell, pulse generator and amplifier circuits; and FIG. 9 is a schematic circuit diagram of the amplifier circuit for the digital counter.

Referring to FIG. 1, conventional planters 10, 11, 12 and 13 are pulled by tractor 14 having a monitoring console 16 connected thereto at a location where the operator of the tractor can watch it without difficulty. The electrical elements within the console are coupled to each of the planters through wires 18.

Each of the planters is a conventional type and is identical to the others. To simplify the description, only planter 10 will be described herein.

The planter 10 includes a hopper 20 for containing the seeds to be planted, a seed chute 22 having an extension (not shown) to a location slightly above the level of the ground, and a seed distribution plate 24 which rotates by the action transmitted by meshed bevelled gears 26 and 28 from shaft 30 which is keyed to gear 28. The shaft 30 is rotated by the rotation of associated rear ground-wheel 31, through a gear and sprocket arrangement. The rotating plate 24 has an aperture which enables the seeds to be disbursed, one by one, into the chute 22.

An auxiliary chute 32, preferably formed of plastic or rubber material, is position within the seed chute 22. The auxiliary chute 32 has a tapered external surface 33 which corresponds to the tapered surface of the seed chute 22, and is removable and easily insertable into the chute. Within the inner wall 34 of the auxiliary chute 32 are embedded a light source 36 and two photocells 38.

The photocells 38 are situated at a location whereby they are responsive to variations in the light emitted by the light source 36. To this end, referring to FIG. 6 it is seen that the inner walls 39 of the auxiliary chute define an opening through which the seeds pass having a trapezoidal configuration. The light source 36 extends across the entire apex of the trapezoid and the photocells 38 are located at the base of the trapezoid, facing the light source 36. The photocells extend substantially across the entire base of the trapezoid.

Seeds passing through the auxiliary chute 32 will cause a variation in the light received by the photocells 38. This variation is sensed and transmitted to indicating devices on the monitoring console 16.

Referring to FIG. 7, it is seen that the electrical elements within the console, and the light sources 36, are powered by the tractor battery 40 to which the console 16 is directly connected. The battery voltage is regulated by a conventional voltage regulator 42 from which current is fed to light sources 36 via lines 44.

As stated above, photocells 38 are responsive to a variation in the light from source 36 resulting from the passage of seeds through the auxiliary chute. The signal from the photocell 38 is applied to a pulse generator 46, which is electrically coupled to the tractor battery via line 47 and voltage regulator 42.

When there is no seed passing through the beam of light emitted by source 36 and received by photocells 38, a constant voltage of a predetermined magnitude will be applied to the pulse generator via line 50. When a seed passes through the light beam emitted by source 36 and received by photocells 38, the resistance of the photocell increases greatly causing a momentary voltage (pulse) to be coupled through capacitor 64 to the pulse generator 46. This operation is different from the normal on/off type of electric eye controllers. In this operation a signal level is produced by only the breaking and restoring of the light beam to the photocell by a fast moving object. When this signal level is applied to a pulse forming circuit and properly amplified it will cause the lamp to illuminate for a predetermined time period. The breaking of the beam alone or the breaking of the beam and the restoration of light over a longer time period will not produce a pulse and will have no effect on the lamp. After the seed has passed through the beam, the signal level returns to the predetermined level thereby creating a negative pulse. In other words, the negative pulse is formed by the increase in the signal caused by the shadow of the seed and the subsequent decrease in the signal after the seed has passed through the light beam.

The output signal 58 from the photocells 38 is illustrated in FIG. 8. The peaks in the signal are formed when the light beam is interrupted by a seed passing through it quickly and the light to the photocells is immediately restored.

Transistor 60 functions as a pulse generator being biased by the voltage divider network comprising resistor 62 and photocells 38. The resistor 62 and the photocells 38 provide a positive bias on the base of transistor 60 when there is no seed passing through the light beam, holding transistor 60 in its non-conductive state. As a seed passes through the light beam, a momentary shadow is placed on a photocell causing its resistance to increase. When this occurs, capacitor 64 will charge through resistor 62 providing a momentary forward bias for the emitter-base circuit of transistor 60, placing it into its conductive state.

Resistors 66, 67 and 68 and capacitor 70 produce a relatively constant-level input pulse to the amplifier stage 52, regardless of any input-level variations to transistor 60 which would occur and are dependent upon the speed, quantity and size of seeds passing through the light beam. Transistor 72 will amplify the pulse, and with resistors 74 and 75 and capacitor 76, will cause a square wave to appear at the input to transistor 78. Transistor 78 will conduct in response to a seed passing through the light beam, because once transistor 60 conducts, transistor 72 will be biased into conduction and capacitor 76 will charge. This will produce a forward bias on transistor 78, turning it into conduction.

Resistors 80 and 81 provide the necessary bias for transistor 82 which amplifies the square wave to cause the high intensity incandescent indicator lamp 54 to flash. Capacitor 84 reduces any voltage variations which may be reflected back into the power circuit.

As a specific example to which no limitation is intended, the values or designations of the circuit components of the illustrated embodiment of the invention are as follows:

| Component: | Value or designation |
|---|---|
| Transistor 60 | 2N404A. |
| Resistor 62 | 3K. |
| Capacitor 64 | 1 mfd., 35 VDC. |
| Resistor 66 | 680 ohm. |
| Resistor 67 | 68K. |
| Resistor 68 | 3.3K. |
| Capacitor 70 | 5.6 mfd. 35 VDC. |
| Transistor 72 | 2N217. |
| Resistor 74 | 4.7K. |
| Resistor 75 | 3.9K. |
| Capacitor 76 | 100 mfd., 20 VDC. |
| Transistor 78 | 2N660. |
| Resistor 80 | 1K. |
| Resistor 81 | 200 ohm. |
| Transistor 82 | 40312 (RCA). |
| Capacitor 84 | 100 mfd., 20 VDC. |

Three other indicating lamps 55, 56 and 57 are provided on the console 16. Each of the indicating lamps is coupled to a different auxiliary chute through its own pulse generator and amplifier. The light source, photocells, pulse generator, amplifier and indicating lamp for each chute are connected to the tractor battery 40 through the voltage regulator 42 in the identical manner in which light source 36, photocells 38, pulse generator 46, amplifier 52 and lamp 54 are connected to the tractor battery.

It is often advantageous for the operator to know the population of seeds which pass through one of the chutes. To this end, a digital counting mechanism 90 is provided on the console, and the operator can select which chute he wishes to monitor as to population, by means of a selector switch 92. The output of each of the pulse generators is connected via lines 94 to a different contact on the selector switch 92, as shown in FIG. 7. The output signal from the designated pulse generator is fed through the selector switch to an amplifier 96 via line 97, is amplified and fed via line 98 to the digital counting mechanism. Each seed passing through the designated auxiliary chute will cause the counter to advance one unit. The counter is of a conventional type, and the photocell counter system allows up to 15 seeds per second to be counted, with high accuracy. This is not a limit to the ability to count at higher rates with a reduction of accuracy. The sensors and associated circuits have the capability to provide indication for seed rates up to 45 per second such as used during planting of peas and soy beans. Although the human eye will not distinguish flash rates beyond about 16 per second, a lamp that appears to be on all the time will indicate normal operation while a malfunction will be indicated if the lamp remains off.

The amplifier 96 comprises a directly-coupled transistor pair, responsive to an input pulse from line 94. The pulse is fed to the base of transistor 100 through a voltage divider consisting of resistors 102 and 104. A resistor 106 is connected to the emitter of transistor 100 and a resistor 108 is connected to the collector, and the transistor is biased so that it will conduct when a pulse of a predetermined magnitude is fed via line 97. When transistor 100 conducts, transistor 110 will be biased into conduction, thereby energizing the digital counter 90 through an electromagnetic switch 112 connected to the collector of transistor 110. A diode 114 is provided in parallel with the electromagnetic coil 112 to reduce any transient voltages caused by the operation of the electromagnetic coil.

As a specific example to which no limitation is intended, the values or designations of the components of the circuit illustrated in FIG. 9 are as follows:

| Component: | Value or designation |
|---|---|
| Transistor 100 | 2N660. |
| Resistor 102 | 470 ohm. |
| Resistor 104 | 1K. |
| Resistor 106 | 330 ohm. |
| Resistor 108 | 15K. |
| Transistor 110 | 40316 (RCA). |
| Diode 114 | 1N645A. |

Summarizing the operation of the system of the present invention, the seeds to be planted are dropped, one by one, through a beam of light directed from light source 36 to photocells 38. Immediately after each seed passes through the light beam, an indicating lamp on the monitoring console flashes to show the operator that a seed is being planted. A series of indicating lights, each responsive to seeds passing through different seed planting chutes, operate in the same manner. The operator may also utilize a selector switch 92 to monitor the population of seeds passing through a designated chute, which passage will be recorded by a digital counting mechanism 90. It is seen that the seed sensing portion of the system does not utilize any mechanical switching elements, and an indicating system is thereby providing which can be impervious to dust particles and moisture.

Although an illustrative embodiment has been shown and described, it is apparent that various modifications and substitutions would be obvious from this disclosure. For example, the circuitry could be such that each of the indicating lamps would remain lit when no seed is passing through the respective chute and the lamp would go out momentarily when a seed passes through the chute. Also, a digital counting mechanism corresponding to each auxiliary chute could be provided.

What is claimed is:

1. In a seed monitoring system for use in seed planting apparatus including a plurality of planters each comprising a hopper and a seed chute, the improvement comprising, in combination, a plurality of auxiliary chutes each of which is adapted for placement within one of said seed chutes, each of said auxiliary chutes having a seed flow opening defined by at least two sides of said auxiliary chute, each of said auxiliary chutes having a light source located therein and extending substantially across one of said two sides and photo-sensitive means located therein and extending substantially across the other of said two sides; means for connecting each of said light sources to a source of current; a plurality of pulse generating means; means for connecting said pulse generating means to a current source; means for transmitting a signal pulse from each of said photo-sensitive means to one of said pulse generating means; said pulse generating means being operable only in response to the breaking and restoring of the light beam to the photo-sensitive means by a fast moving object; means for amplifying the pulses generated by each of said pulse generating means; and means remote from and electrically coupled to said amplifying means for visually indicating passage of seeds through said chute.

2. In a seed monitoring system as described in claim 1, wherein a capacitor couples said photo-sensitive means to said pulse generating means.

3. In a seed monitoring system as described in claim 1, wherein said indicating means comprises a plurality of lamps, each of which emits a flashing light in response to variations in the signal from each of said photo-sensitive means resulting from passage of seeds through the corresponding auxiliary chute, and further including a digital counting mechanism remote from and electrically coupled to said photo-sensitive means and responsive to variations in the signal from a preselected one of said photo-sensitive means for counting the seeds which pass through the corresponding preselected chute.

4. In a seed monitoring system as described in claim 3, including a selector switch coupled between said pulse generating means and said digital counting mechanism, said selector switch having a number of inputs each of which corresponds to a different chute and having an output for coupling a variably selective one of said pulse generating means to said digital counting mechanism.

References Cited

UNITED STATES PATENTS

| 2,269,117 | 1/1942 | London | 250—223 XR |
| 2,540,911 | 2/1951 | Rembusch et al. | 250—223 XR |
| 2,907,015 | 9/1959 | Young | 340—239 |
| 2,967,297 | 1/1961 | Ferguson | 340—239 |
| 3,076,897 | 2/1963 | Skirvin | 250—209 |
| 2,653,309 | 9/1963 | Hausz | 340—38 XR |
| 3,063,596 | 11/1962 | D'Autheville et al. | 221—7 |
| 3,355,102 | 11/1967 | Gregory | 221—7 XR |
| 2,864,292 | 12/1958 | Elliott et al. | 172—6 |
| 3,040,980 | 6/1962 | Mann et al. | |

DONALD J. YUSKO, Primary Examiner

D. MYER, Assistant Examiner

U.S. Cl. X.R.

111—1; 221—7; 250—223